United States Patent Office 3,729,443
Patented Apr. 24, 1973

3,729,443
SULPHUR-CONTAINING ANTIOXIDANTS
Hans Jakob Peterli, Fullinsdorf, Basel-Land, and Hansjorg Heller, Riehen, Switzerland, assignors to Ciba-Geigy Corporation, Ardsley, N.Y.
No Drawing. Continuation-in-part of application Ser. No. 822,344, Mar. 6, 1969, now Patent No. 3,546,163, which is a division of application Ser. No. 613,730, Feb. 3, 1967, now Patent No. 3,506,716. This application Sept. 9, 1970, Ser. No. 72,894
The portion of the term of the patent subsequent to Dec. 8, 1987, has been disclaimed
Claims priority, application Switzerland, Feb. 8, 1966, 1,759/66
Int. Cl. C08f 45/58; C08g 51/58
U.S. Cl. 260—45.95 C    3 Claims

ABSTRACT OF THE DISCLOSURE

Compositions comprising an organic polymeric material sensitive to oxidation and sulfur containing sterically hindered 1,1-bis-(hydroxyphenyl)alkans which compounds have antioxidant properties and substantially protect the organic polymeric material against oxidative degradation. A typical embodiment is a composition comprising polypropylene and 1,1-bis-(2-methyl-4-hydroxy-5-tert. butylphenyl)-3-octadecylthiobutane in an amount sufficient to protect said polypropylene against oxidative deterioration.

CROSS-REFERENCE

This application is a continuation-in-part of our U.S. application Ser. No. 822,344, filed Mar. 6, 1969, now U.S. Pat. 3,546,163, which is a divisional application of our U.S. application, Ser. No. 613,730, filed Feb. 3, 1967 now U.S. Pat. 3,506,716.

DETAILED DISCLOSURE

This invention relates to compositions comprising an organic material sensitive to oxidation and new, sulfur-containing antioxidants.

The stabilizing of polyolefins against the detrimental influence of atmospheric oxygen with phenolic anti-oxidants is known. The stabilizing action of these active substances is often supported by so-called synergists, e.g. by thiodialkane dicarboxylic acid derivatives such as β-thiodipropionic acid esters and amides. Such mixtures of synergists, however, have some disadvantages: for example, it is necessary to carefully adjust the proportions of the components of the mixture. Also, thiodialkane dicarboxylic acid derivatives are easily volatile, can easily be extracted, they have a bad odor, sometimes they discolor the polyolefins to which they are added and occasionally they adversely influence the mechanical properties of the polyolefins.

It has now been found that sulfur-containing antioxidants which do not have the disadvantages given above are obtained when two moles of the same or different, preferably however, identical, hydroxyphenyl compounds of Formula I

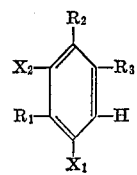
(I)

are reacted with one mole of an aldehyde of Formula II

(II)

to form a compound of Formula III

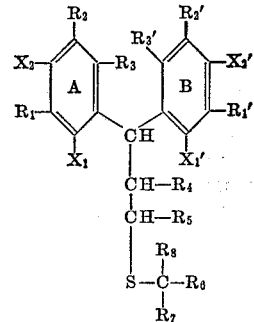
(III)

in which formulae
one of $X_1$ and $X_2$ and also one of $X_1'$ and $X_2'$ represents the hydroxyl group and the other two X's represent hydrogen,
each of $R_1$ and $R_1'$ independently represents (a) an alkyl group having a total of 3 to 20 carbon atoms in a chain which is branched at the α-carbon atom, which alkyl group is unsubstituted or substituted by phenyl, lower alkyl-phenyl, lower alkoxy-phenyl, chloro-phenyl, bromo-phenyl or fluoro-phenyl, or (b) a 5 to 12 membered cycloalkyl group having 5 to 20 carbon atoms;
each of $R_2$ and $R_2'$ represents independently (a) hydrogen, (b) lower straight-chain alkyl, (c) phenyl, (d) lower alkyl-phenyl, (e) lower alkoxy-phenyl, (f) chloro-phenyl, (g) bromo-phenyl, (h) fluoro-phenyl, (i) an alkyl group having a total of 3 to 20 carbon atoms in a chain which is branched at the α-carbon atom, which alkyl group is unsubstituted or substituted by phenyl, lower alkyl-phenyl or lower alkoxy-phenyl, or (j) 5 to 12 membered cycloalkyl of a total of 5 to 20 carbon atoms;
each of $R_3$, $R_3'$, $R_4$ and $R_5$ represents hydrogen or lower alkyl;
$R_6$ represents hydrogen, alkyl of from 1 to 19 carbon atoms, alkoxyalkyl of from 2 to 19 carbons atoms or alkylthioalkyl of from 2 to 19 carbon atoms;
$R_7$ represents hydrogen or the methyl group and
$R_8$ represents hydrogen or the methyl group and, in addition, when $R_7$ is hydrogen, it also represents an alkyl group having 2 to 6 carbon atoms.

Compounds of Formula III in which the benzene rings A and B are identically substituted, are preferred because the production of these compounds is much simpler than that of the unsymmetrically substituted compounds.

Compounds analogous to those of Formula III but containing straight-chain alkyl groups as $R_1$ and/or $R_1'$ are not useful as antioxidants for the protection of such oxidation-sensitive materials as polypropylene, since they are liable to be decomposed by the action of alkali metal-containing impurities which are frequently present in the polymeric materials requiring protection by antioxidant adjuvants.

As alkyl groups having a total of 3 to 20 carbon atoms in a chain-branched at the α-carbon atom when present in the position of $R_1$ or $R_1'$ and/or in the position of $R_2$ or $R_2'$, the isopropyl, sec. butyl, tert. butyl, 1-methylbutyl, 1-ethylpropyl, tert. pentyl or 1,1-dimethylhexyl group are mentioned. Should such alkyl groups contain a phenyl radical then they are, in particular, the 1-phenylethyl group; when the phenyl radical is substituted then such substituents are e.g., halogens such as fluorine, chlorine or bromine, but preferably lower alkyl or lower alkoxy groups, having at most 4 carbon atoms. Unsubstituted or alkyl-substituted 5 to 12 membered cycloalkyl groups having 5 to 20 carbon atoms when present in $R_1$ or $R_1'$ and/or $R_2$ or $R_2'$, are in particular, unsubstituted cycloalkyl such as the cyclopentyl, cyclohexyl or cyclododecyl group, or lower alkyl-substituted cycloalkyl such as 1-methyl-cyclohexyl.

Lower straight chain alkyl groups in the position of $R_2$ or $R_2'$ advantageously have 1 to 6 carbon atoms.

Lower alkyl groups in the position of $R_3$, $R_3'$, $R_4$, $R_5$ and $R_8$ advantageously contain 1 to 6 carbon atoms; these alkyl groups as well as the alkyl groups in the position of $R_6$ can have a straight or branched chain. Examples of alkylthioalkyl and alkoxyalkyl radicals as $R_6$ are, e.g. octylthiomethyl, dodecyloxymethyl, 1,1,3,3-tetramethylbutylthiomethyl and 3-methoxypropyl.

In particularly preferred compounds of Formula III, $X_1$ and $X_1'$ each represent hydrogen, $X_2$ and $X_2'$ each represent the hydroxyl group, $R_1$ and $R_1'$ each represent a lower alkyl group, especially the methyl group, but most preferably the tert. butyl group, $R_2$ and $R_2'$ each represent hydrogen, a lower alkyl or especially the methyl or tert. butyl group, $R_3$ and $R_3'$ each represent hydrogen or the methyl group, $R_4$ represents hydrogen, and $R_5$ represents hydrogen or the methyl group.

In preferred compounds of Formula III $R_6$ represents an alkyl radical having 3 to 19, particularly 10 to 17 carbon atoms, or an alkylthiomethyl radical the alkyl group of which having 8-18, preferably 8-14 carbon atoms, as such radicals produce a less unpleasant odor and promote good tolerance with polyolefins. In those cases where an unpleasant odor is of no great importance, compounds of Formula III wherein $R_6$ is a lower alkyl or lower alkylthio-lower alkyl radical can also be used.

$R_7$ and $R_8$ advantageously represent hydrogen, as only those mercapto aldehydes of Formula II which are derived from primary mercaptans yield uniform reaction products which can easily be worked up.

Examples of preferred compounds are those of the formula

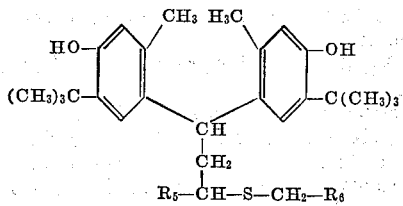

wherein $R_5$ and $R_6$ represent the groups shown below:

| $R_5$ | $R_6$ | F.P., °C. |
|---|---|---|
| H | n-$C_{11}H_{23}$— | 54 |
| H | n-$C_{17}H_{35}$— | 46 |
| $CH_3$ | n-$C_{11}H_{23}$— | 122 |
| $CH_3$ | n-$C_{17}H_{35}$— | 106 |

The hydroxyaryl compounds of Formula I usable as starting compounds are known or can be produced in a known manner. Examples of such starting compounds are:

2-isopropyl-phenol,
2-tert.butyl-phenol,
2-tert.pentyl-phenol,
2-isopropyl-4-methyl- or -ethyl- phenol,
2-tert.butyl-4-methyl- or -ethyl- phenol,
2-(1,1,3,3-tetramethylbutyl)-4-methyl- or -ethyl- phenol,
2,4-di-tert.butyl-phenol,
2-(1-phenylethyl)-4-phenylphenol,
2-cyclohexyl-4-phenylphenol,
2-(1-methylcyclohexyl)-4-methyl-phenol,
2-cyclododecyl-4-methyl-phenol,
2-tert.butyl-4-(p-methoxyphenyl)-phenol,
2-tert.butyl-4-(p-methylphenyl)-phenol,
2-isopropyl-5-methyl- or -ethyl- phenol,
2-tert.butyl-5-methyl- or -ethyl- phenol,
2-tert.pentyl-5-methyl- or -ethyl- phenol,
2-(1,1-dimethylhexyl)-5-methyl- or -ethyl- phenol,
2-(1,1,3,3-tetramethylbutyl)-5-methyl- or -ethyl- phenol,
2-(1-phenylethyl)-5-methyl-phenol,
2-cyclopentyl-5-methyl-phenol,
2-[α-(4-methylphenyl)-ethyl]-5-methyl-phenol,
2-isopropyl-6-methyl- or -ethyl- phenol,
2-tert.butyl-6-methyl- or -ethyl- phenol,
2-(1,1,3,3-tetramethylbutyl)-6-methyl- or -ethyl- phenol,
2,6-di-tert.butyl-phenol or mixtures of the isomeric 2-tetramethyloctyl-5-methyl-phenols containing, e.g.

2-(1,3,5,7-tetramethyloctyl)-5-methyl-phenol,
2-(1,3,3,5-tetramethyloctyl)-5-methyl-phenol,
2-(2-methylnonadecyl)-4-methylphenol,
2-[1-(4-methoxyphenyl)-ethyl]-4-methylphensol,
2,6-diisopropylphenol,
2,6-bis-(1-ethyl-1-methylpropyl)-phenol,
2,6-bis-(2-methylonoadecyl)-phenol,
2,6-bis-(1-phenylethyl)-phenol,
2,6-bis-[1-(4-ethylphenyl)-ethyl]-phenol,
2,6-bis-[1-(4-butoxyphenyl)-ethyl]-phenol,
2,6-bis-[1-(4-chlorophenyl)-ethyl]-phenol,
2,6-bis-[1-(4-bromophenyl)-ethyl]-phenol,
2,6-bis-[1-(2-fluorophenyl)-ethyl]-phenol,
2-[1-(4-chlorophenyl)-ethyl]-phenol,
2-[1-(4-chlorophenyl)-ethyl]-6-methyl-phenol,
2-(3,5-dibromophenyl)-6-methyl-phenol,
2-[1-(3,5-dibromophenyl)-ethyl]-6-methyl-phenol,
2-tert.butyl-4-(p-chlorophenyl)-phenol,
2-tert.pentyl-4-(m-bromophenyl)-phenol or
2-cyclohexyl-4-(o-fluorophenyl)-phenol;

2-(1-tetradecyl-cyclohexyl)-4-methyl-phenol [prepared by condensation of benzene and myristic acid chloride in the presence of a Friedel Crafts catalyst, hydrogenation to tetradecyl-cyclohexene and reaction of the latter with p-cresol in the presence of concentrated sulphuric acid as catalyst]; and 2-(1-tetradecyl-cyclohexyl)-6-methyl-phenol, [prepared by reaction of tetradecyclohexene with o-cresol in the presence of aluminum o-cresolate as catalyst]. The 2,5-disubstituted phenols of Formula I are preferred for reasons of synthesis.

The sulfur-containing aldehydes of Formula II usable as starting compounds are obtained by known processes e.g. by adding a mercaptan of Formula IV

to an α,β-unsaturated aldehyde of the Formula V

wherein $R_4$, $R_5$, $R_6$, $R_7$ and $R_8$ have the meanings given in Formula III.

Examples of sulfur-containing aldehydes of Formula II are the addition products of the following mercaptans: methyl mercaptan, ethyl mercaptan, propyl mercaptan, butyl mercaptan, octyl mercaptan, dodecyl mercaptan, tetradecyl mercaptan, hexadecyl mercaptan, octadecyl mercaptan, eicosyl mercaptan, 2-ethyl-hexyl mercaptan, 2,2-dimethyloctyl mercaptan, 2-octylthio-ethyl mercaptan, 2-(1,1,3,3-tetramethylbutylthio)-ethyl mercaptan, 2-dodecyloxy-ethyl mercaptan, 2-dodecylthio-ethyl mercaptan, 4-methoxy-butyl mercaptan, 2-methoxy-ethyl mercaptan, 2-methylthio-ethyl mercaptan, 4-dodecyloxy-butyl mercaptan, 2-octadecylthio-ethyl mercaptan, 2-methylthioethyl mercaptan, 2-methoxy-ethyl mercaptan, 2-octadecyloxy-ethyl mercaptan or 4-dodecylthio-butyl mercaptan, with the following α,β-unsaturated aldehydes: acrolein, crotonaldehyde, α-methyl acrolein, pentenal.

The compounds of Formula III may be obtained by the processes described in application Ser. No. 613,730.

Examples of materials which are sensitive to oxidation, and which are protected with the hydroxyaryl compounds of Formula III according to the invention are, in particular, polymeric compounds, e.g., natural polymers such as rubber and, principally, synthetic polymers. Both polyaddition as well as polycondensation products are meant by synthetic polymeric compounds. Examples of polyaddition compounds are the polymers of styrene, butadiene, isoprene, also the co-polymers, poly-polymers and graft polymers of these compounds themselves as well as with acrylonitrile, acrylic and methacrylic acid esters and, possibly, with vinyl esters and vinyl chloride, as well as polyolefins. Examples of polycondensation products are polycarbonates, synthetic polyamides such as polyamide 6, 6.6 and 11, or polyacetals. The antioxidants according to the invention are used chiefly for the stabilization of polyolefins. By polyolefins are meant polymers from olefins having 2–10 carbon atoms, the olefins having 3–10 carbon atoms being α-olefins such as butene-1, pentene-1, or methylpentene-1. In particular, the new antioxidants are suitable for the stabilization of polyethylene and isotactic polypropylene. These polyolefins have a tendency of auto-oxidation which results, e.g. in a deterioration of the mechanical and electric properties as well as discoloration.

In order to protect the oxidation-sensitive organic material, in particular polyolefins or mixtures thereof, from the disadvantageous effect of oxygen, the sulfur-containing antioxidants of Formula III are incorporated thereinto. In the case of polyolefins, for example, this is done depending on the type thereof, by adding these compounds and, optionally, other additives into the melt by the usual technical methods before or during moulding, or by mixing this carrier material with solutions or slurries of the antioxidants according to the invention and, optionally, other additives, in organic solvents and subsequently evaporating the latter. Other additives which can be used are:

Antioxidants of different structure, e.g. esters of 4-hydroxy-3,5-di-tert.butyl - β - carboxyethylbenzene, esters of 4-hydroxy-3,5-di-tert.butyl-benzyl phosphonic acid; 2,2'- or 4,4'-dihydroxy-3,3'-di-tert.butyl-5,5'- or -6,6'-dimethyl-diphenyl sulfide or -diphenyl methane; 2,6-bis-(2-hydroxy-3-tert.butyl-5-methylbenzyl)-4-alkyl phenols, 2,4,6-tris-(4-hydroxy - 3,5 - di-tert.butylbenzyl) - mesitylene, 2,4-bis-octylmercapto - 6 - (4 - hydroxy - 3,5 - di-tert.butylphenylamino)-s-triazine or 2-octylmercapto-4,6-bis-(4-hydroxy-3,5-di-tert.butylphenoxy)-s-triazine;

So-called chelators such as tridecyl phosphite, trioctadecyl phosphite, also metal deactivators such as N-o-hydroxybenzylidene-N'-o-hydroxybenzoylhydrazine or bis-salicylate-1,2-propylenediamine;

UV absorbers such as 2-hydroxy-4-alkoxy- or 2-hydroxy-4-benzyloxy-benzophenones or 2-(2-hydroxyalkylphenyl)-benzotriazoles and their 5-chloro derivatives, So-called synergists such as thiodipropionic acid dilauryl and dioctadecyl esters, And also, depending on the intended use, pigments, e.g. carbon; fillers, and optical brighteners.

The hydroxyaryl compounds according to the invention of Formula III are used in amounts of 0.05 to 5% by weight, in particular 0.1 to 1% by weight, calculated on the material to be protected.

Polyolefins having a content of compounds of Formula III are substantially protected against damage due to oxidation. Compared with similar, previously known compounds, the antioxidants according to the invention are distinguished by a better action. Above all, they enable the amount of synergists usually used to be greatly reduced or, possibly, completely eliminated and they thus make possible the production of polyolefin moulds and threads, the odor of which is completely acceptable. In addition the fastness to washing of the added stabilizers is improved. In certain cases, the new compounds also have the advantage of being less deactivated by fillers or pigments such as are often admixed with the polyolefin compositions.

The following non-limitative examples illustrate the invention further. The temperatures are given therein in degrees centigrade. Percentages are by weight unless expressly stated otherwise.

Example 1

(a) To a mixture of 202 g. of dodecyl mercaptan and 2 g. of triethylamine, 73.5 g. of crotonaldehyde are added dropwise, the addition being made within 40 minutes under an atmosphere of nitrogen at 50–55°. The reaction mixture is kept for half an hour at 80–90°, then cooled and then added dropwise within a further half hour while stirring at 5 to 10°, to a mixture of 328 g. of 2-tert.butyl-5-methyl-phenol, 1000 ml. of glacial acetic acid and 100 g. of 96% sulfuric acid. When producing this latter mixture, care must be taken that the temperature does not exceed 5°. On completion of the addition, the reaction solution is stirred for 3 hours at room temperature whereupon the 1,1-bis-(2-methyl-4-hydroxy-5-tert.butylphenyl)-3-dodecylthiobutane of the formula

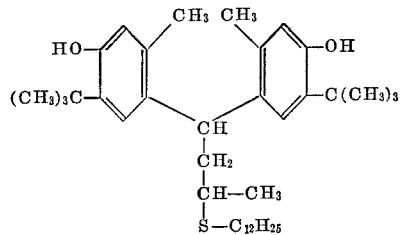

precipitates. After recrystallization from methanol, the pure product melts at 121–122°.

(b) If, in the above Example 1–(a), instead of the 328 g. of 2-tert.butyl-5-methyl-phenol, 380 g. of 2-cyclohexyl-5-methyl-phenol, 356 g. of 2-tert.amyl-5-methyl-phenol or 440 g. of 2-(1,1-dimethylhexyl)-5-methyl-phenol are used, then with otherwise the same procedure as described, 1,1 - bis · (2-methyl-4-hydroxy-5-cyclohexylphenyl) - 3 - dodecylthiobutane, 1,1, - bis-(2-methyl-4-hydroxy - 5 - tert.pentylphenyl) - 3-dodecylthiobutane or 1,1 - bis - [2 - methyl - 4-hydroxy-5-(1,1-dimethylhexyl) phenyl]-3-dodecylthiobutane respectively is obtained.

(c) If in the above Example 1–(a), instead of the 328 g. of 2-tert.butyl-5-methyl-phenol, a mixture of 164 g. of 2-tert.butyl-5-methyl-phenol and 178 g. of 2-tert.pentyl-5-methyl-phenol is used and otherwise the same procedure is followed, then a mixture is obtained which contains about the same amounts of 1,1-bis-(2-methyl-4-hydroxy - 5 - tert.butylphenyl)-3-dodecylthiobutane, 1,1-bis - (2 - methyl - 4-hydroxy-5-tert.pentylphenyl)-3-dodecylthiobutane and 1 - (2 - methyl - 4 - hydroxy-5-tert. butylphenyl) - 1 - (2 - methyl-4-hydroxy-5-tert.pentylphenyl)-3-dodecylthiobutane.

(d) If in the above Example 1–(a), instead of 202 g. of dodecyl mercaptan, 262 g. of 2-dodecylthioethyl mercaptan (B.P. (10 torr)=204°) or 180 g. of 2-octyloxyethyl mercaptan (B.P. (10 torr)=170–175°) are used and otherwise the same procedure is followed, then 1,1-bis - (2 - methyl - 4 - hydroxy-5-tert.butylphenyl)-3-(2-dodecylthioethyl) - thiobutane or 1,1 - bis-(2-methyl-4-hydroxy - 5 - tert.butylphenyl) - 3 - (2-octyloxyethyl)-thiobutane are obtained.

(e) By repeating Example 1–(a), but using in lieu or 328 g. of 2-tert.butyl-5-methyl-phenol, a mixture of 164 g. of 2-tert.butyl-4-methyl-phenol and 178 g. of 2-tert.-pentyl-5-methyl-phenol, a mixture is obtained which consists of about equal amounts of 1-(2-hydroxy-3-tert.butyl- 5 - methylphenyl) - 1 - (2 - methyl-4-hydroxy-5-tert.-pentylphenyl) - 3 - dodecylthiobutane, 1,1 - bis-(2-hydroxy - 3 - tert.butyl - 5 - methylphenyql) - 3 - dodecylthiobutane and 1,1-bis-(2-methyl-4-hydroxy-tert.pentylphenyl)-3-dodecylthiobutane.

The mixture of diphenyl-3-dodecylthiobutanes obtained as end-products under (c) and (e), supra, are separated into their components by well-known chromatographic procedures. However, it is much more economical to use the mixture as obtained directly as antioxidants in such organic polymeric material as polypropylene. The latter is thereby stabilized very satisfactorily against deterioration by oxidation. Shaped articles made therefrom such as cups, plates, dishes and the like do not develop an unpleasant odor when stored for longer periods of time, as may be the case when other antioxidants have been used as stabilizers in the polypropylene.

Example 2

In 200 ml. of ligroin, 32.8 g. of 2-tert.butyl-5-methylphenol and 14.6 g. of 3-butylthiopropionaldehyde are dissolved. Hydrogen chloride is introduced into this solution for 2 hours while cooling at 0–4°, whereupon the color changes from yellow to deep green. After being left to stand for 12 hours at room temperature, the reaction solution is extracted with water and then the ligroin is evaporated under vacuum to 60 ml., whereupon the 1,1-bis - (2 - methyl - 4 - hydroxy-5-tert.butylephenyl)-3-butylthiopropane of the formula

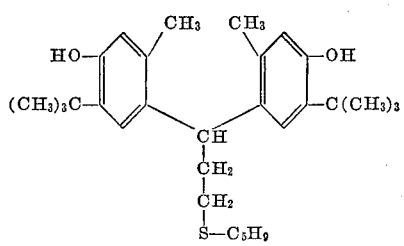

precipitates. After recrystallization from ligroin, it melts at 145°.

The 3-butylthiopropionaldehyde used is obtained as follows: 180 g. of butyl mercaptan are added dropwise to 112 g. of acrolein and 0.5 g. of triethylamine at 0°. The reaction mixture obtained is stirred for 1 hour at room temperature, made neutral with acetic acid and then distilled. The fraction which boils at 105–106°/15 torr is the desired aldehyde. It is of sufficient purity for the further reactions.

If in the above example, instead of 14.6 g. of 3-butyl-thiopropionaldehyde, an equivalent amount of one of the aldehydes mentioned in column 1 of the following table is used and otherwise the procedure given in the example is followed, the compounds specified in column 2 of the table are obtained:

| | |
|---|---|
| 3-butylthiobutyraldehyde | 1,1-bis-(2-methyl-4-hydroxy-5-tert.butylphenyl)-3-butylthiobutane. |
| 3-octadecylthiopropionaldehyde. | 1,1-bis-(2-methyl-4-hydroxy-5-tert.butylphenyl)-3-octadecylthiopropane. |
| 3-dodecylthiopropionaldehyde | 1,1-bis-(2-methyl-4-hydroxy-5-tert.butylphenyl)-3-dodecylthiopropane. |

Example 3

In 200 ml. of toluene, 32.8 g. of 2-tert. butyl-4-methylphenol and 14.6 g. of 3-butyl thiopropionaldehyde are dissolved. Hydrogen chloride is introduced into this solution for 2 hours while cooling at 0–4°. After leaving to stand for 24 hours at room temperature, water is added to the reaction mixture, the organic solution is washed free of acid and concentrated to dryness. After distillation of the residue, 1,1-bis-(2-hydroxy-3-tert.butyl-5-methylphenyl)-3-butylthiopropane of the formula

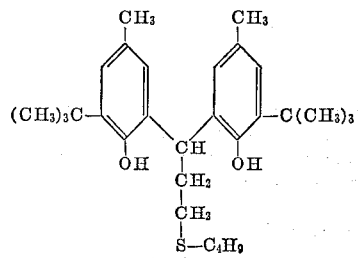

is obtained at 195–200°/0.005 torr.

Example 4

In 50 ml. of ethanol, 10.3 g. of 2,6-di-tert.butyl-phenol and 15 g. of boron fluoride diethyl ether adduct (having about 48% BF₃ content) are dissolved. To the solution obtained, 6.8 g. of 3-dodecylthiobutyraldehyde are added dropwise at 0–10°. The temperature then rises to about 50° and, after completion of the reaction, the mixture is stirred for 48 hours at 40°. After cooling, the 1,1-bis-(4-hydroxy-3,5-di-tert.butyl - phenyl)-3-dodecylthiobutane of the formula

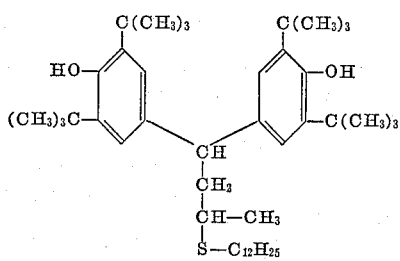

crystallizes out and, after purification by recrystallization from isopropanol, it melts at 86°.

A soomewhat less pure product is obtained if the reaction is performed without ethanol. In this case, however, the reaction temperature must be kept below 6° by cooling.

Example 5

In 80 ml. of glacial acetic acid and 25 g. of 96% sulfuric acid, 82 g. of 2-tert.butyl-5-methyl-phenol are dissolved at 0–5°, and, at the same temperature, a solution of β-chloropropionaldehyde, obtained by saturating a mixture of 17.5 g. of crotonaldehyde and 30 ml. of glacial acetic acid with hydrogen chloride, is added dropwise. After one hour, the mixture obtained is heated to room temperature and kept for one hour at this temperature. 100 ml. of 80% acetic acid are then added to the reaction mixture whereupon the 1-1-bis-(2-methyl-4-hydroxy-5-tert.butylphenyl) - 3 - chlorobutane precipitates. After washing with water, the product is recrystallized from methanol. It melts at 206°.

In 30 ml. of butanol, 21 g. of this 1,1-bis-(2-methyl-4-hydroxy-5-tert.butylphenyl)-3-chlorobutane are dissolved and the solution is added dropwise to a 25° warm solution of 10.1 g. of dodecyl mercaptan and 8.1 g. of sodium methylate in 30 ml. of butanol. After refluxing for 12 hours, the reaction mixture is neutralized with acetic acid, extracted with toluene, the toluene solution is washed free of acid with water and the toluene is distilled off. Non-reacted starting product is removed from the residue by fractionated crystallization from aqueous methanol, a little 1-1-bis-(2 - methyl-4-hydroxy-5-tert.butylphenyl)-3-chlorobutane first crystallizing. The product obtained in later fractions is identical with the 1,1-bis-(2-methyl-4-hydroxy-5-tert.butylphenyl) - 3 - dodecylthiobutane obtained according to Example 1.

Example 6

In 80 ml. of glacial acetic acid and 25 g. of 96% sulfuric acid, 82 g. of 2-tert.butyl-5-methyl-phenol are dissolved at 0–5°. A solution of 17.5 g. of crotonaldehyde and 30 ml. of glacial acetic acid which has been saturated for 20 minutes at −10° with hydrogen bromide, is added dropwise within 2 hours to the above solution at 0–5°. After 1 hour, the reaction mixture is heated to room temperature and kept for 1 hour at this temperature. 100 ml. of 80% acetic acid are then added to the mixture whereupon the 1,1-bis-(2-methyl-4-hydroxy-5-tert.butylphenyl)-3-bromobutane precipitates. After washing with water, the product is recrystallized from methanol. It melts at 216°.

In 100 ml. of dimethyl formamide, 46.1 g. of this 1,1-bis-(2-methyl-4-hydroxy-5-tert.butylphenyl) - 3 - bromobutane are dissolved. This solution is added dropwise to a solution of 28.6 g. of octadecyl mercaptan and 16.2 g. of sodium methylate in 100 ml. of dimethyl formamide at 100°, and the mixture is stirred for 2 hours at this temperature; 200 ml. of water are then added to the reaction mixture and the precipitated product is recrystallized from hexane. The 1,1-bis-(2-methyl-4-hydroxy-5-tert.butylphenyl) - 3 - octadecylthiobutane obtained of the formula

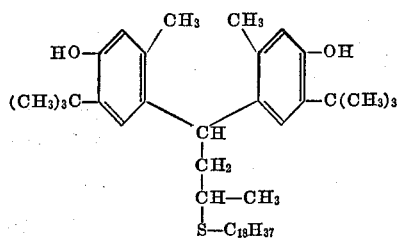

melts at 106°.

If in the above example, instead of the addition product of hydrogen bromide to crotonaldehyde, the addition product of hydrogen bromide to methacrolein is used, then with otherwise the same procedure, 1,1-bis-(2-methyl-4-hydroxy-5-tert.butylphenyl)-2-methyl - 3 - octadecylthiopropane is obtained.

If, instead of the 28.6 g. of octadecyl mercaptan used in the above example, 28.6 g. of 1,1-dimethyldecyl mercaptan are used, then with otherwise the same procedure as described, 1,1-bis-(2-methyl-4-hydroxy - 5 - tert.butylphenyl)-3-(1,1-dimethyldecylthio)butane is obtained.

Example 7

In 50 ml. of glacial acetic acid, 19 g. of phenol and 27.2 g. of 3-dodecylthiobutyraldehyde are dissolved and the solution is added dropwise at 0–10° within 1 hour to 60 g. of sulfuric acid whereupon the mixture is stirred overnight. After diluting with water, the 1,1-bis-(4-hydroxyphenyl)-3-dodecylthiobutane is isolated by column chromatography.

To 44 g. of 1,1-bis-(4-hydroxyphenyl)-3-dodecylthiobutane, 0.1 g. of concentrated sulfuric acid are added and, at 80°, 25 g. of isobutylene are introduced within 2 hours. After removal of the sulfuric acid by washing the reaction mixture with water, the same product as described in Example 4 is obtained.

Instead of sulfuric acid, also phosphoric acid, acidic clays and boron fluoride etherate can be used.

Example 8

Fifty grams of polypropylene powder (density: 0.90, crystalline M.P. 166–167°) are intimately mixed with one of the antioxidants given in the following Table I in the proportions given therein, the mixing being performed at room temperature. The mixture, in the form of a flowing melt, is homogenized for 10 minutes in a laboratory kneader heated to 200°. The mass is then pressed at 200° into sheets of 1 mm. strength, from which sample strips of the dimension 140 x 10 x 1 mm. are cut.

The time is then determined after which a sample shows signs of decomposition, e.g. brittleness, in an air circulating oven at 149°.

TABLE I

| Test No. | Compound | Antioxidant | Time, days |
|---|---|---|---|
| (a) | | None | 1 |
| (b) | I | 0.1 g. of 1,1,3-tris-(4-hydroxy-3-tert.butyl-6-methylphenyl)-butane (known stabilizer). | 9 |
| (c) | II | 0.1 g. of 1,1-bis-(2-methyl-4-hydroxy-5-tert.butylphenyl)-3-dodecylthiobutane. | 27 |

As can be seen from the table, the stabilizing action of the antioxidant II according to the invention is clearly superior to that of the known stabilizer I.

Example 9

Fifty grams of polyethylene powder (density 0.96, unstabilized) are intimately mixed with one of the antioxidants given in the following Table II in the proportions given therein, the mixing being performed at room temperature, and the mixture is homogenized for 10 minutes on a 150–170° hot set of mixing rollers. The mass is then pressed at 180° for 6 minutes into sheets of 1 mm. thickness, from which sample strips of 140 x 10 x 1 mm. are cut.

The time is determined in which a sample begins to decompose in an air circulating oven at 120°.

TABLE II

| Amount, grams | Antioxidant | Days |
|---|---|---|
| | Without antioxidant | 33 |
| 0.01 | 1,1-bis-(2-methyl-4-hydroxy-5-tert.butylphenyl)-3-dodecyl-thiobutane. | 78 |
| 0.025 | do | 85 |
| 0.05 | do | 115 |
| 0.01 | 1,1-bis-(2-methyl-4-hydroxy-5-tert.butylphenyl)-3-dodecylthiopropane. | 85 |

Example 10

The five antioxidants listed below were each incorporated at a concentration of 1% into the following natural rubber base compound and cured for 20 minutes at 125°:

| | Parts |
|---|---|
| Pale crepe | 100 |
| Zinc oxide | 5 |
| Titanium dioxide | 10 |
| Blanc fixe | 75 |
| Stearic acid | 1.0 |
| Zinc dithiocarbamate | 0.375 |
| Sulphur | 2.0 |

The resulting vulcanisates were aged for three days in a 1% detergent solution at 90°, after which time the modulus (force in kg./cm.²) of each sample at 500% elongation was measured and expressed in percent of the initial modulus of the unaged sample. A large retention of modulus thus means high effectiveness of the antioxidant:

| Antioxidant: | Modulus (percent) |
|---|---|
| 1 | 84 |
| 2 | 44 |
| 3 | 61 |
| 4 | 67 |
| 5 | 56 |
| Control | 34 |

1. 1,1-bis-(2-methyl-4-hydroxy-5-tert.butylphenyl)-3-dodecylthiobutane,
2. 2,2'-methylene-bis-(4-methyl-6-tert.butylphenol),
3. 2,2'-methylene-bis-(4-methyl-6-α-methyl-cyclohexylphenol),
4. 4,4'-thiobis-(3-methyl-6-tert.butylphenol),
5. 2,6-di-tert.butyl-β-cresol.

Example 11

2,6-di-tert. butyl-p-cresol (I) and 1,1-bis-(2-methyl-4-hydroxy-5-tert.butylphenyl) - 3 - dodecylthiobutane (II), respectively, were incorporated at a concentration of 1% into a low molecular weight polyamide hot melt adhesive (sold under the trademark Versamid 741). The resulting mixtures were heated to 200° and the time for the first appearance of surface skinning was noted (in hours):

|  | Hours |
|---|---|
| Blank | 2 |
| Compound I | 4 |
| Compound II | 10 |

Example 12

To 150 g. of low density polyethylene granules (Lupolen 1800H, provided by BASF, Ludwigshafen, Germany) 3 g. (2%) of carbon black and 75 mg. (0.05%) of 2,6-di-tert. butyl-p-cresol (I) or 1,1-bis-(2-methyl-4-hydroxy-5-tert.butylphenyl)-3-dodecylthiobutane (II), respectively are admixed, and processed for several hours on a two roll mill at a temperature of 200°. While the material containing antioxidant I solidified completely due to oxygen-induced cross-linking after two hours, the material containing antioxidant II could be processed for 8 hours until cross-linking could be observed.

Example 13

Carboxylated SBR–Latex, containing 49% solids with a styrene-butadiene ratio of 46:54 was mixed with 1%, respectively of 2,6-di-tert.butyl-p-cresol(I) and of 1,1-bis-(2 - methyl - 4 - hydroxy - 5 - tert.butylphenyl)-3-dodecylthiobutane (II) and drawn at a thickness of 10 mils on unsized cotton.

The treated cotton sheets were exposed in an oven at 130° for 130 hours after which time the coating containing I was completely brittle, whereas compound II provided excellent protection of flexibility.

Example 14

100 parts of polyacetal are mixed with 0.5 part of a ternary polyamide as an acid-acceptor and 0.5 part of 1,1-bis-(2 - methyl-4-hydroxy-5-tert.butyl-phenyl)-3-dodecylthiobutane (I) on a Brabender plastograph at 190° for 3 minutes. 1 mm. thick plates are pressed from this mixture at 190° and allowed to cool in a cold press.

Samples from these plates are examined for weight-loss in a TGA-apparatus at 220° in air and in a forced-draft oven at 140°.

The results, compared with those obtained when no antioxidant is present, are given below.

|  | Weight-loss at 220° after 15 minutes (sample weight: 10 mg.) percent | Hours to 4% weight-loss at 140° (sample weight=1.8 g.) |
|---|---|---|
| No antioxidant | 31 | 94 |
| 0.5% (I) | 5 | 308 |

What is claimed is:

1. A composition comprising an organic material sensitive to oxidation selected from the group consisting of polycarbonates, synthetic polyamides of the nylon type, polyacetals and a stabilizing amount of a compound of the formula

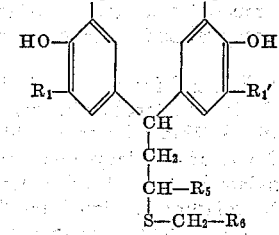

wherein $R_1$ and $R_1'$ is a (lower) alkyl group,
$R_2$ and $R_2'$ is a (lower) alkyl group,
$R_5$ is an alkyl group of from 1 to 19 carbon atoms.

2. A composition according to claim 1 wherein said compound is selected from the group consisting of 1,1-bis-(2-methyl-4-hydroxy-5-tert.butylphenyl)-3-dodecylthiopropane,
1,1-bis-(2-methyl-4-hydroxy-5-tert.butylphenyl)-3-octadecylthiopropane,
1,1-bis-(2-methyl-4-hydroxy-5-tert.butylphenyl)-3-dodecylthiobutane,
1,1-bis-(2-methyl-4-hydroxy-5-tert.butylphenyl)-3-octadecylthiobutane,
1,1-bis-(2-methyl-4-hydroxy-5-tert.butylphenyl)-3-butylthiopropane,
1,1-bis-(2-hydroxy-3-tert. butyl-5-methyl-phenyl)-3-butylthiopropane, and
1,1-bis-(2-methyl-4-hydroxy-5-tert.butylphenyl)-3-butylthiobutane.

3. The composition according to claim 1 wherein $R_1$ and $R_1'$ is tert. butyl group and $R_2$ and $R_2'$ is a methyl group.

References Cited

UNITED STATES PATENTS 3,285,855   11/1966   Dexter _____ 252—57

DONALD E. CZAJA, Primary Examiner

W. E. PARKER, Assistant Examiner